US008660796B2

(12) United States Patent
Jacobson et al.

(10) Patent No.: US 8,660,796 B2
(45) Date of Patent: Feb. 25, 2014

(54) METHOD AND SYSTEM OF PROCESSING GAMMA COUNT RATE CURVES USING NEURAL NETWORKS

(75) Inventors: Larry A. Jacobson, Richmond, TX (US); Dingding Chen, Plano, TX (US); John A. Quirein, Georgetown, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 31 days.

(21) Appl. No.: 12/740,726

(22) PCT Filed: Aug. 26, 2008

(86) PCT No.: PCT/US2008/074322
§ 371 (c)(1),
(2), (4) Date: Apr. 30, 2010

(87) PCT Pub. No.: WO2010/024802
PCT Pub. Date: Mar. 4, 2010

(65) Prior Publication Data
US 2011/0137566 A1 Jun. 9, 2011

(51) Int. Cl.
*G01V 1/40* (2006.01)
*G01V 5/12* (2006.01)
*G01V 9/00* (2006.01)
*G01V 3/38* (2006.01)

(52) U.S. Cl.
USPC ........................................ 702/8; 702/2; 702/5

(58) Field of Classification Search
USPC .................................................... 702/2, 5, 8
See application file for complete search history.

(56) References Cited

U.S. PATENT DOCUMENTS

| | | |
|---|---|---|
| 2,836,356 A | 2/1952 | Forrest |
| 3,311,875 A | 3/1967 | Geyer |
| 3,509,458 A | 4/1970 | Girard |
| 3,784,828 A | 1/1974 | Hayes |
| 3,954,006 A | 5/1976 | Anderson |
| 4,459,479 A | 7/1984 | Smith, Jr. |
| 4,852,067 A | 7/1989 | White |
| 4,937,747 A | 6/1990 | Koller |
| 5,008,845 A | 4/1991 | Adcock |
| 5,019,978 A | 5/1991 | Howard |
| 5,184,079 A | 2/1993 | Barber |
| 5,210,691 A | 5/1993 | Freedman |
| 5,251,286 A | 10/1993 | Wiener |
| 5,300,770 A | 4/1994 | Allen |
| 5,345,077 A | 9/1994 | Allen |
| 5,444,619 A | 8/1995 | Hoskins |

(Continued)

OTHER PUBLICATIONS

Office Action, U.S. Appl. No. 13/146,437, mailed Aug. 15, 2013.

(Continued)

*Primary Examiner* — Janet Suglo
(74) *Attorney, Agent, or Firm* — Mark E. Scott; Conley Rose, P.C.

(57) ABSTRACT

Processing gamma count rate decay curves using neural networks. At least some of the illustrative embodiments are methods comprising obtaining a gamma count rate decay curve one each for a plurality of gamma detectors of a nuclear logging tool (the gamma count rate decay curves recorded at a particular borehole depth), applying the gamma count rate decay curves to input nodes of a neural network, predicting by the neural network a geophysical parameter of the formation surrounding the borehole, repeating the obtaining, applying and predicting for a plurality of borehole depths, and producing a plot of the geophysical parameter of the formation as a function of borehole depth.

4 Claims, 7 Drawing Sheets

(56) References Cited

U.S. PATENT DOCUMENTS

| | | | |
|---|---|---|---|
| 5,530,243 | A | 6/1996 | Mathis |
| 5,536,938 | A | 7/1996 | Mills |
| 5,659,169 | A | 8/1997 | Mickael |
| 5,684,693 | A | 11/1997 | Li |
| 5,753,813 | A * | 5/1998 | Hagiwara ............... 73/152.54 |
| 5,821,413 | A | 10/1998 | Chapin |
| 5,828,981 | A | 10/1998 | Callender |
| 5,862,513 | A | 1/1999 | Mezzatesta |
| 5,867,806 | A | 2/1999 | Strickland |
| 5,883,515 | A | 3/1999 | Strack |
| 5,940,777 | A | 8/1999 | Keskes |
| 6,044,325 | A | 3/2000 | Chakravarthy |
| 6,150,655 | A | 11/2000 | Odom |
| 6,207,953 | B1 | 3/2001 | Wilson |
| 6,216,089 | B1 | 4/2001 | Minerbo |
| 6,219,619 | B1 | 4/2001 | Xiao |
| 6,289,285 | B1 | 9/2001 | Neff |
| 6,304,086 | B1 | 10/2001 | Minerbo |
| 6,374,185 | B1 | 4/2002 | Taner |
| 6,381,542 | B1 | 4/2002 | Zhang |
| 6,606,565 | B1 | 8/2003 | Strickland |
| 6,997,257 | B2 * | 2/2006 | Snoga ............... 166/254.1 |
| 7,280,987 | B2 | 10/2007 | Chen |
| 7,361,887 | B2 | 4/2008 | Trcka |
| 7,365,308 | B2 | 4/2008 | Trcka |
| 7,613,665 | B2 | 11/2009 | Chen |
| 2004/0195517 | A1 | 10/2004 | Rowland |
| 2004/0257240 | A1 | 12/2004 | Chen |
| 2006/0226351 | A1 | 10/2006 | Stoller |
| 2006/0243898 | A1 | 11/2006 | Gilchrist |
| 2006/0284066 | A1 | 12/2006 | Jacobson |
| 2007/0011115 | A1 | 1/2007 | Smith |
| 2007/0023623 | A1 | 2/2007 | Trcka |
| 2007/0023624 | A1 | 2/2007 | Trcka |
| 2007/0023625 | A1 | 2/2007 | Trcka |
| 2007/0023626 | A1 | 2/2007 | Riley |
| 2007/0246649 | A1 | 10/2007 | Jacobi |
| 2008/0228680 | A1 | 9/2008 | Chen |

OTHER PUBLICATIONS

PCT International Search Report and Written Opinion for PCT Patent Application No. PCT/US2008/074322; filed Aug. 26, 2008.

John A. Quirein—An Assessment of Neural Networks Applied to Pulsed Neutron Data for Predicting Open Hole Triple Combo Data—44th SPWLA Paper.

Dingding Chen—Neural Network Ensemble Selection Using Multi-Objective Genetic Algorithm in Processing Pulsed Neutron Data—SPWLA 45th Annual Logging Symposium, Jun. 6-9, 2000.

John A. Quirein—Formation Density Prediction Using Pulsed Neutron Capture Tools—SPWLA 46th Annual Logging Symposium, Jun. 26-29, 2005.

R. Odom, Design and Initial Field-Test Results of a New Pulsed-Neutron Logging System for Cased Reservoir Characterization—SPWLA, Paper O, May 25, 2008.

J.R. Scheibal,—Differentiation of Hydrocarbon Type in Gulf of Mexico Clastic Reservoirs by Inelastic Pulsed Neutron Capture Data, SPE 24737, Jun. 1996.

M. Holmes—A Method to Quantify Gas Saturation in Gas/Water Systems, Using Density and Neutron Logs—Interpretation of Reservoir Properties When Compared with Gas Saturations from Resistivity Analysis—Digital Formation, Inc. Denver, CO 2007.

Alpana Bhatt, Ph.D., Reservoir Properties from Well Logs Using Neural Networks, Norwegian University of Science and Technology, 2002.

J. Chen—Joint Invention of Seismic AVO and EM Data for Gas Saturation Estimation Using a Sampling Based Stochastic Model, SEG Int'l Exposition and 74th Annual Meeting, Denver, CO 2004.

A. Badruzzaman, Is Accurate Gas/Steam Determination Behind pipe Feasible with Pulsed Neutron Measurements—Chevron Energy Technology Co;, SPE 110098, Oct. 30, 2007.

A. Badruzzaman—Multi-Sensor Through-Casing Density and Saturation Measurement Concepts with a Pulsed Neutron Source; A Modeling Assessment, ChevroTexaco Energy Technology Co., SPE 89884, Nov. 8, 2004.

A. Badruzzaman—Progress and Future of Pulsed Neutron Technology in Oil Field Management; Chevron Petroleum Technology Co.; SPE 49228, Sep. 27, 1998.

International PCT Search Report and Written Opinion for PCT Patent Application No. PCT/US2009/041222, filed Apr. 21, 2009.

International PCT Search Report for PCT Patent Application No. PCT/US2001/049193, filed Dec. 19, 2001.

* cited by examiner

METHOD AND SYSTEM OF PROCESSING GAMMA COUNT RATE CURVES USING NEURAL NETWORKS

CROSS-REFERENCE TO RELATED APPLICATIONS

This application claims the benefit of PCT application serial number PCT/US2008/074322, filed Aug. 26, 2008, titled "Method and System of Processing Gamma Count Rate Decay Curves Using Neural Networks", and which application is incorporated by reference as if reproduced in full below.

BACKGROUND

In the oil and gas industry today, there is an increasing emphasis on obtaining nuclear measurements, such as formation density and neutron porosity, in both open hole and/or cased-hole environments. However, the data obtained by pulsed neutron tools is tainted by the fact that the particles that interrogate the formation (e.g., neutrons, gammas) also interrogate the borehole fluid (e.g., drilling fluid). In cased-hole environments, the particles also interrogate the metallic casing and the cement between the casing and the formation. While techniques have been developed to account for the presence of materials and substances other than those of the formation of interest, any improvement in the processing of logging data to obtain more accurate predictions of geophysical parameters (whether for open hole or cased-hole logging) will provide a competitive benefit. Moreover, processing of logging data that makes more viable logging systems that do not use chemical sources (e.g., AmBe and Cs137) is also needed.

BRIEF DESCRIPTION OF THE DRAWINGS

For a detailed description of exemplary embodiments, reference will now be made to the accompanying drawings in which:

FIG. 10 shows a computer system in greater detail in accordance with at least some embodiments.

NOTATION AND NOMENCLATURE

Certain terms are used throughout the following description and claim to refer to particular system components. As one skilled in the art will appreciate, oilfield service companies may refer to a component by different names. This document does not intend to distinguish between components that differ in name but not function.

In the following discussion and in the claims, the terms "including" and comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Gamma" or "gammas" shall mean energy created and/or released due to neutron interaction with atoms, and in particular atomic nuclei, and shall include such energy whether such energy is considered a particle (i.e., gamma particle) or a wave (i.e., gamma ray or wave).

"Gamma count rate decay curve" shall mean, for a particular gamma detector, a plurality of count values, each count value based on gammas counted during a particular time bin. The count values may be adjusted up or down to account for differences in the number of neutrons giving rise to the gammas or different tools, and such adjustment shall not negate the status as a "gamma count rate decay curve." However, the status as a "gamma count rate decay curve" shall be destroyed if the count values are modified as the ratio with count rates from other gamma detectors

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
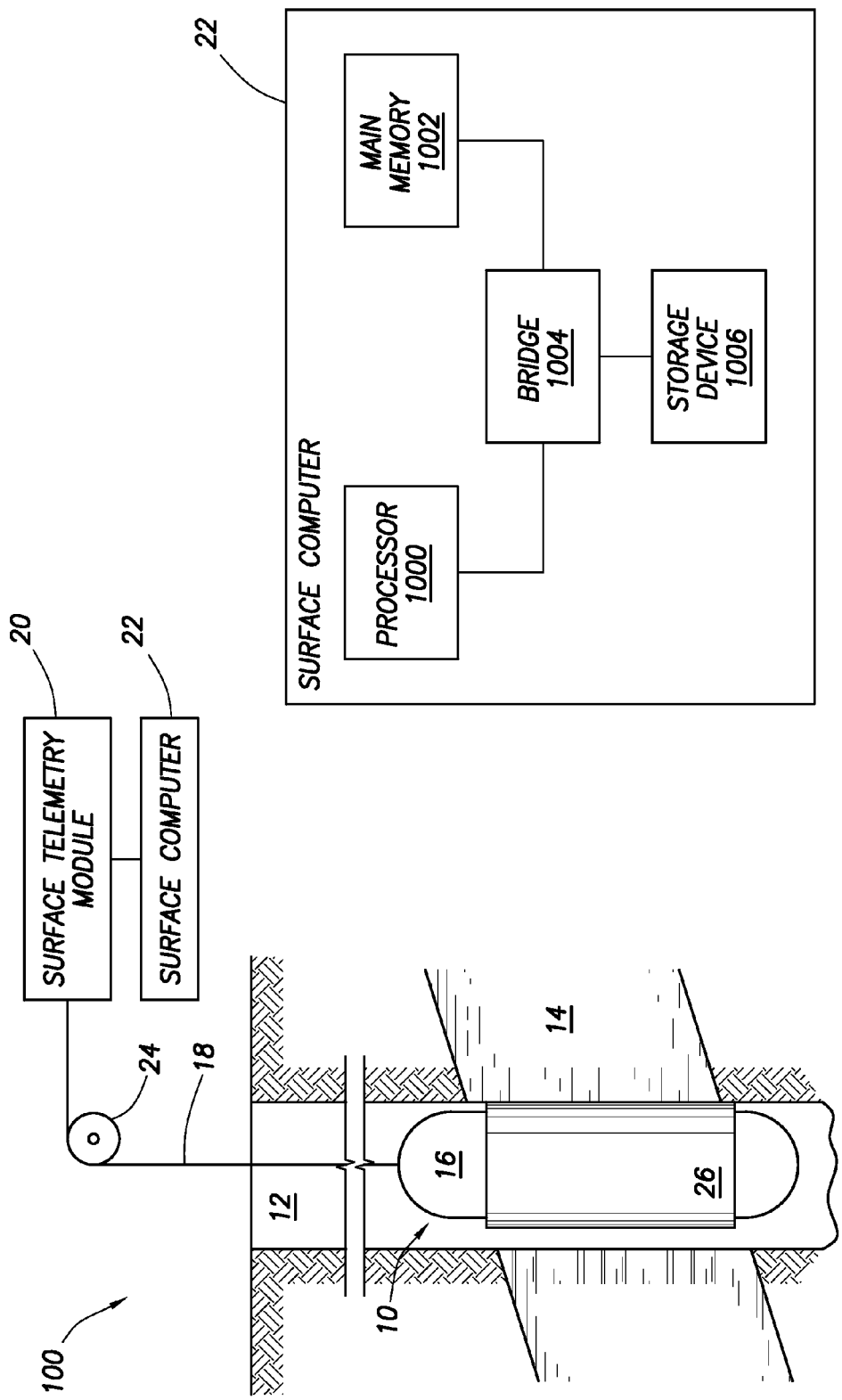
FIG. 1 shows a system in accordance with at least some embodiments.

FIG. 1 illustrates a nuclear logging system 100 constructed in accordance with a least some embodiments. In particular, system 100 comprises a logging tool 10 placed within a borehole 12 proximate to a formation 14 of interest. The tool 10 comprises a pressure vessel 16 within which various subsystems of the tool 10 reside, and the pressure vessel 16 is suspended within the borehole 12 by a cable 18. Cable 18, in some embodiments a multi-conductor armored cable, not only provides support for the pressure vessel 16, but also communicatively couples the tool 10 to a surface telemetry module 20 and a surface computer 22. The tool 10 may be raised and lowered within the borehole 12 by way of the cable 18, and the depth of the tool 10 within the borehole 12 may be determined by depth measurement system 24 (illustrated as a depth wheel). In some embodiments, the pressure vessel 16 may be covered with a thermal neutron absorptive coating 26 (the thickness of which is exaggerated for clarity of the figure); however, in other embodiments the thermal neutron absorptive coating may be only partially present, omitted altogether, or may be in the form of a polymeric sleeve telescoped over the pressure housing 16.

Figure 2:
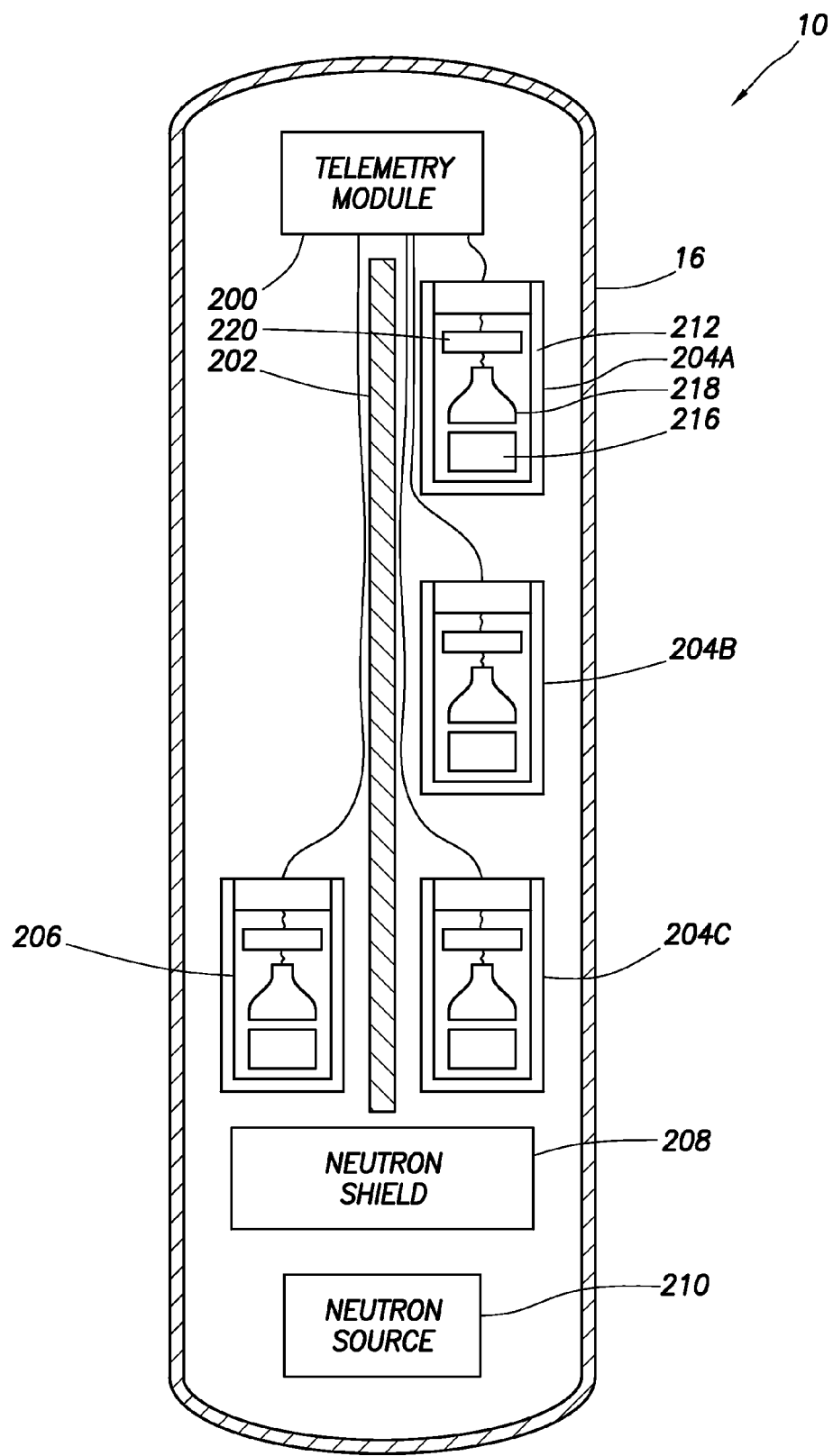
FIG. 2 shows a simplified cross-sectional view of a logging tool in accordance with at least some embodiments.

FIG. 2 shows a simplified cross-sectional view of the logging tool 10 to illustrate the internal components in accordance with at least some embodiments. In particular, FIG. 2 illustrates that the pressure vessel 16 houses various components, such as a telemetry module 200, borehole shield 202, a plurality of gamma detectors 204 (in this illustrative case 3 gamma detectors) configured to more favorably receive gammas from the formation, a borehole gamma detector 206 configured to more favorably receive gammas from within the borehole, a neutron shield 208 and a neutron source 210. While the gamma detectors 204 and 206 are shown above the neutron source 210, in other embodiments the gamma detectors may be below the neutron source. Gamma detector 204C, in some embodiments, may be on the order of 12 inches from the neutron source. The gamma detector 204B may be on the order of 24 inches from the neutron source 210. Finally, the gamma detector 204A may be on the order of 36 inches from the neutron source 210. Other spacing's may be equivalently used. In accordance with at least some embodiments, the gamma detector 206 may be at approximately the same elevation as gamma detector 204C. However, in other embodiments the gamma detector 206 may be at any suitable distance from the neutron source 210. The favorability of a gamma detector to borehole-sourced gammas or formation-sourced gammas is created, at least in part, by the shield material 202, which may be a high density material (e.g., HEVIMET® available from General Electric Company of Fairfield, Conn.).

In some embodiments the neutron source 210 is a Deuterium/Tritium neutron generator. However, any neutron source capable of producing and/or releasing neutrons with sufficient energy (e.g., greater than 10 Mega-Electron Volt (MeV)) may equivalently used. The neutron source 210, under command from a surface computer 22, generates and/or releases energetic neutrons. In order to reduce the eradiation of the gamma detectors 204 and 206 by energetic neutrons from the neutron source 210, the neutron shield 208 separates the neutron source 210 from the gamma detectors 204 and 206. The neutron shield may be constructed of a high density material (e.g., HEVIMET®). Because of the speed of the energetic neutrons (e.g., 30,000 kilometers second and/or more), and because of collisions of the neutrons with atomic nuclei that change the direction of movement of the neutrons, a neutron flux is created around the logging tool 10 that extends into the formation 14.

Neutrons generated and/or released by the source 210 interact with atoms by way of inelastic collisions and/or thermal capture. In the case of inelastic collisions, a neutron inelastically collides with atomic nuclei, a gamma is created (an inelastic gamma), and the energy of the neutron is reduced. The neutron may have many inelastic collisions with the atomic nuclei, each time creating an inelastic gamma and losing energy. At least some of the gammas created by the inelastic collisions are incident upon the gamma detectors 204 and 206 (depending on the direction at which the gamma approaches the tool 10). One or both of the arrival time of a particular gamma and its energy may be used to determine the type of atom with which the neutron collided, and thus parameters of the formation. For example, gammas associated with inelastic collisions may be used to determine formation properties such as bulk density and carbon-oxygen ratio.

After one or more inelastic collisions (and corresponding loss of energy) a neutron reaches an energy known as thermal energy (i.e., a thermal neutron). At thermal energy a neutron can be captured by atomic nuclei. In a capture event the capturing atomic nucleus enters an excited state and the nucleus later transitions to a lower energy state by release of energy in the form of a gamma (known as a thermal gamma). At least some of the thermal gammas created by thermal capture are also incident upon the gamma detectors 204 and 206. One or both of the arrival time of a particular gamma and its energy may be used to determine the type of atom into which the neutron was captured, and thus parameters of the formation 14. For example, the energy of capture gammas may be used to determine the formation lithology.

Still referring to FIG. 2, the gamma detectors 204 and 206 detect arrival and energy of gammas. Referring to gamma detector 204A as indicative of all the gamma detectors 204 and 206, a gamma detector comprises an enclosure 212, and within the enclosure 212 resides; a crystal 216 (e.g., a three inch by four inch yttrium/gadolinium silicate scintillation crystal); a photo multiplier tube 218 in operational relationship to the crystal 216; and a processor 220 coupled to the photomultiplier tube 218. As gammas are incident upon/within the crystal 216, the gammas interact with the crystal 216 and flashes of light are emitted. Each flash of light itself is indicative of an arrival of a gamma, and the intensity of light is indicative of the energy of the gamma. The output of the photomultiplier tube 218 is proportional to the intensity of the light associated with each gamma arrival, and the processor 220 quantifies the output as gamma energy and relays the information to the surface computer 22 (FIG. 1) by way of the telemetry module 200.

Figure 3:
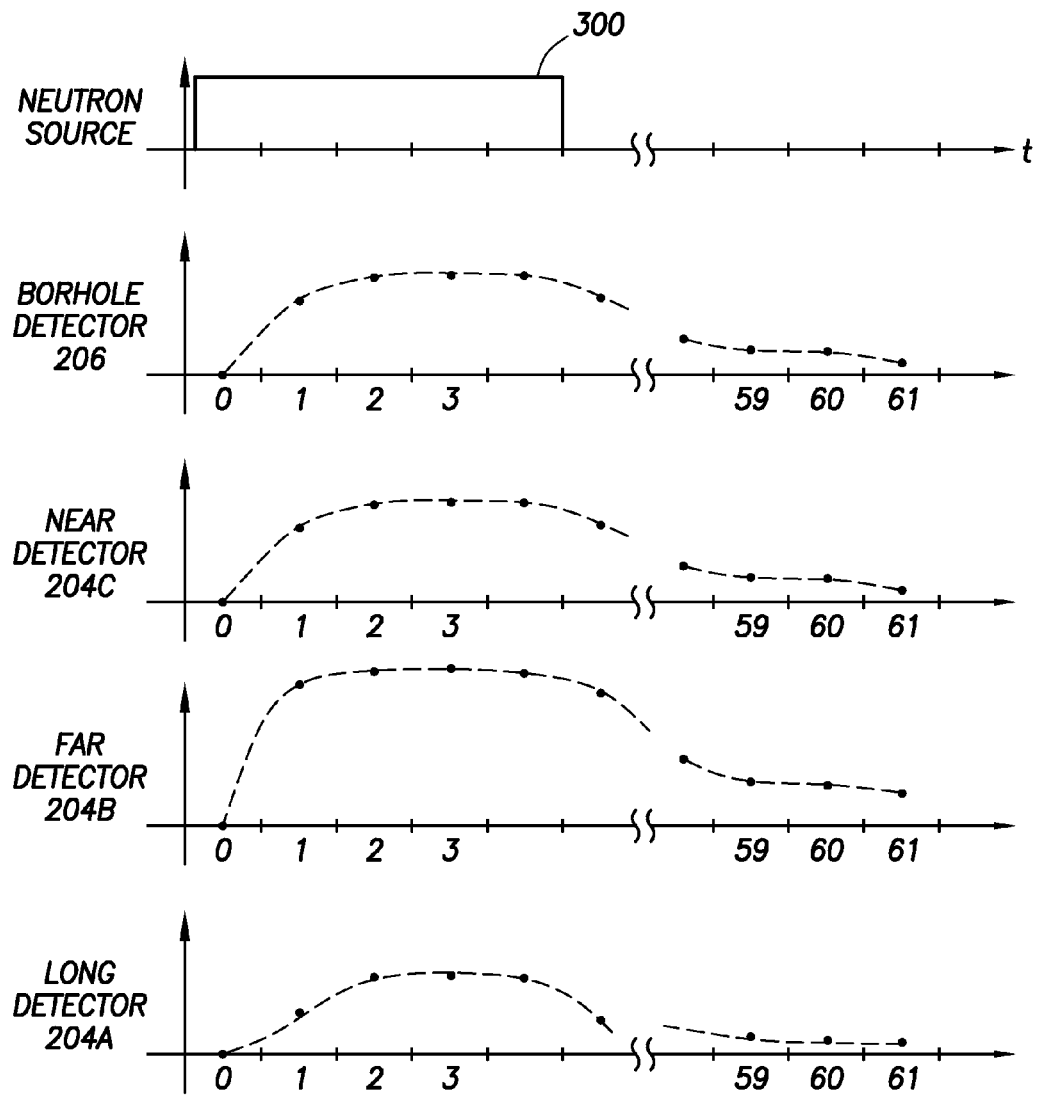
FIG. 3 shows a plurality of graphs of count rate as a function of time in accordance with at least some embodiments.

FIG. 3 shows a plurality of graphs as a function of corresponding time in order to describe how the gamma arrivals are recorded in accordance with at least some embodiments. In particular, FIG. 3 shows a graph relating to activation of the neutron source 210, as well as gamma count rates for the borehole detector 206, the near detector 204C, the far detector 204B, and the long detector 204A. The graph with respect to the neutron source 210 is Boolean in the sense that it shows when the neutron source is generating and/or releasing neutrons, and when the neutron source is not. In particular, with respect to the neutron source graph, the neutron source is generating and/or releasing neutrons during the asserted state 300, and the neutron source is off during the remaining time. In accordance with the various embodiments, a single interrogation (at a particular borehole depth) comprises activating the neutron source for a predetermined amount of time (e.g., 80 microseconds) and counting the number of gamma arrivals at each of the detectors not only during the activation time of the neutron source, but also for a predetermined amount of time after the source is turned off. In at least some embodiments, the total amount of time for a single interrogation (i.e., a single firing of the neutron source and the predetermined amount of time after the neutron source is turned off) may span approximately 1250 microseconds, but other times may be equivalently used.

Still referring to FIG. 3, with respect to counting gamma arrivals by the gamma detectors 204 and 206, the interrogation time is divided into a plurality of time slots or time bins. With reference to the graph for the borehole detector 206 as illustrative of all the gamma detectors, the interrogation time is divided into 61 total time bins. In accordance with at least some embodiments, the first 32 time bins each span 10 microseconds, the next 16 time bins each span 20 microseconds, and the remaining time bins each span 50 microseconds. Other numbers of time bins, and different time bin lengths, may be equivalently used. Each gamma that arrives within a particular time bin increases the count value of gammas within that time bin. While in some embodiments the actual arrival time of the gammas within the time bin may be discarded, in other embodiments the actual arrival may be retained and used for other purposes. Starting with time bin 0, each gamma detector counts the gamma arrivals and increases the count value for the particular time bin for each gamma arrival. Once the time period for the time bin expires, the system starts counting anew the arrivals of gammas within the next time bin until count values for all 61 time bins have been obtained. In some cases, the system starts immediately again by activating the neutron source and counting further time bins; however, the count values within each time bin (for a particular borehole depth) are recorded either within the tool 10, or by way of the surface computer 22.

Illustrative count values for each time bin are shown in FIG. 3 as dots in the center of each time bin. The count value for each time bin is represented by the height of the dot above the x-axis (i.e., the y-axis value). Taking all the count values for a particular detector together, the dots may be connected by an imaginary line (shown in dashed form in FIG. 3) to form a mathematical curve illustrative of the number of gamma arrivals as a function of time detected by the particular gamma detector. In accordance with the various embodiments, the plurality of count values is referred to as a gamma count rate decay curve. All the curves taken together (the curve for each gamma detector) may be referred to as full-set decay curves.

The full-set decay curves contain a plethora of information. For example, the full-set decay curves, properly processed, may reveal one or more geophysical parameters of the formation 14 surrounding the borehole 12. The geophysical parameters that may be determined comprise synthetic bulk density, neutron porosity, as well as macroscopic capture cross section (known as sigma). Other geophysical parameters may also be determined from the full-set decay curves. Processing of the full-set decay curves will be discussed in greater detail after a discussion of an alternative representation of the full set decay curves.

Figure 4:
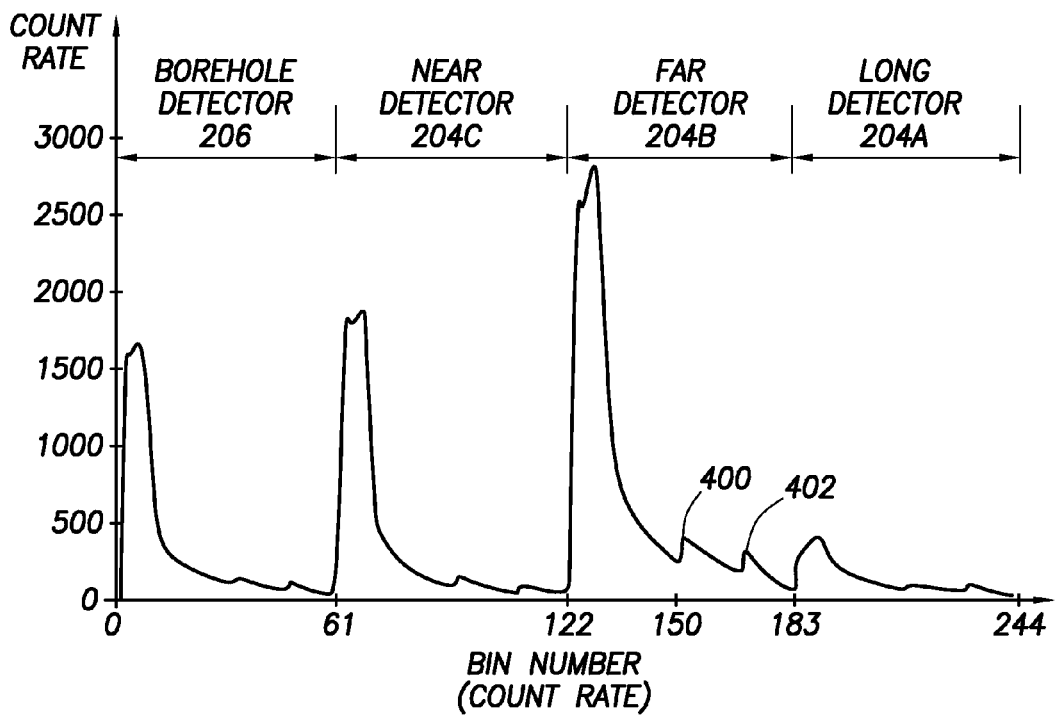
FIG. 4 shows an alternative representation of gamma count rate decay curves in accordance with at least some embodiments.

The illustrative plots of FIG. 3 are shown with respect to time. FIG. 4 shows similar information, except that the x-axis of the plot is bin number rather than time. In particular, if each bin for all the gamma detectors is uniquely numbered there are 244 bins (61 bins times 4 detectors equals 244). Thus, FIG. 4 should not be interpreted to imply that the detector counts take place sequentially; rather, FIG. 4 should only be interpreted as an alternative mechanism to view the count values for a particular interrogation (at a particular borehole depth). FIG. 4 also shows interesting characteristics of the decay curves that were not visible in the illustration of FIG. 3. In particular, and referring to the decay curve for the far detector 204B, the count values take an initial jump to approximately 2800 counts (as a peak) and then fall off at approximately bin number 150. However, the count values jump after bin 150, particularly at point 400 and again at point 402. These apparent increases in count values are indications of increased time bin span, as opposed to an absolute jump in gamma ray count rate.

Referring generally to the decay curves, the count values for each detector take an initial jump (during the period of time when the neutron source is activated) and the count values decay as a function of time (or as a function of increasing time bin). The count value within each time bin is proportional not only to formation geophysical parameters, but also the number of neutrons created and/or released by the neutron source during the burst time. Stated otherwise, all other geophysical parameters held constant, the count values illustrated in FIGS. 3 and 4 will change depending on the number of neutrons generated and/or released by the neutron source.

The reasons the neutron source may generate and/or release different numbers of neutrons are many. For example, downhole temperature may affect the number of neutrons the neutron source generates and/or releases. Moreover, the neutron source may have inherent fluctuations in the number of neutrons generated and/or released, particularly with sources where the neutrons are created by collisions of atoms on a target material. In the related art, in order to address changes and fluctuations in the number of neutrons generated and/or released by the neutron source, the full-set decay curves discussed with respect to FIGS. 3 and 4 are modified in the form of ratios before further processing. For example, in the related art the count values in respective time bins between the long detector 204A and the near detector 204C are combined as a ratio, and the ratio used for further processing. As yet another example, in the related art the count values in respective time bins between the far detector 204B and the long detector 204A are combined as a ratio, and the ratio used for further processing. The apparent theory in forming of ratios is that by taking ratios fluctuations in the number of neutrons generated and/or released during interrogation are removed. It follows that in the related art the primary input data set used to determine geophysical parameters of the formation is ratios of count rates for the various gamma detectors.

The inventors of the present specification have found that ratios are not needed for processing to determine the geophysical parameters, and in fact may increase total error in calculating and/or predicting geophysical parameters. In accordance with the various embodiments, count values within time bins are applied directly to the processing elements for further processing.

Figure 5:
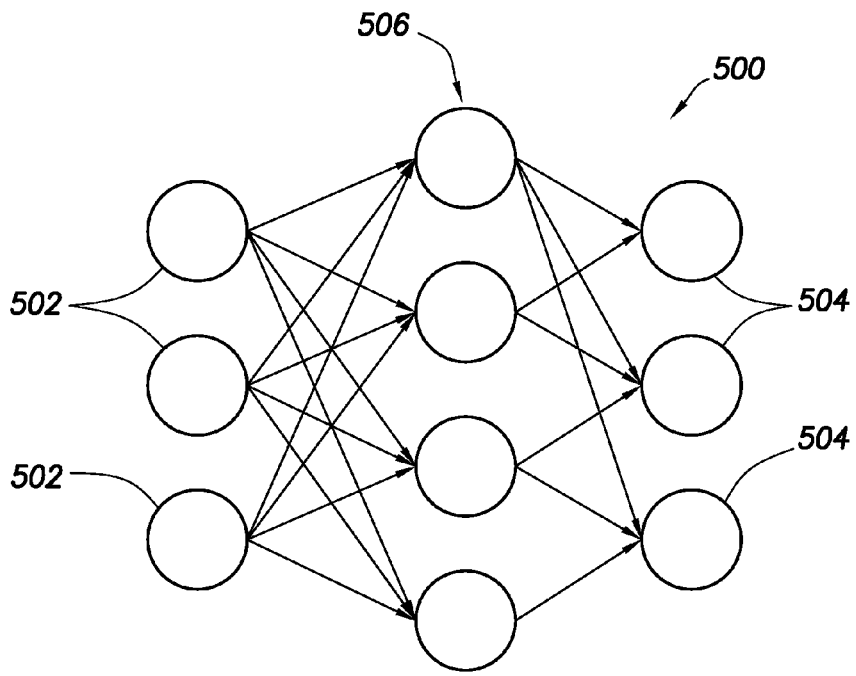
FIG. 5 shows a neural network in accordance with at least some embodiments.

The processing of the full-set decay curves in order to calculate and/or predict one or more geophysical parameters, in accordance with the various embodiments, is based on artificial neural networks. While one of ordinary skill in the art is familiar with neural networks, a brief digression into neural networks is helpful in understanding the innovative contributions of the inventors. In particular, FIG. 5 illustrates a simplified neural network 500. The neural network 500 comprises a plurality of input nodes 502. Input nodes 502 are the points within the neural network that the data is provided for further processing. Moreover, the neural network 500 comprises one or more output nodes 504. Each output node 504 represents a calculated and/or predicted parameter based on the input data at the input nodes 502. Between the input nodes 502 and the output nodes 504 are one or more layers of hidden nodes 506. As shown in FIG. 5, the hidden nodes 506 are coupled to some, or all, of the input nodes 502. Likewise, the hidden nodes 506 are coupled to some, or all, of the output nodes 504. Each of the hidden nodes 506 performs a mathematical function that is determined or learned during a training phase of the neural network 500. While the illustrative FIG. 5 shows three input nodes 502, three output nodes 504, and four hidden nodes 506, any number of input nodes 502 and output nodes 504 may be used respectively. Likewise, any number of hidden nodes 506, and multiple layers of hidden nodes 506, may be used to implement the neural network.

Figure 6:
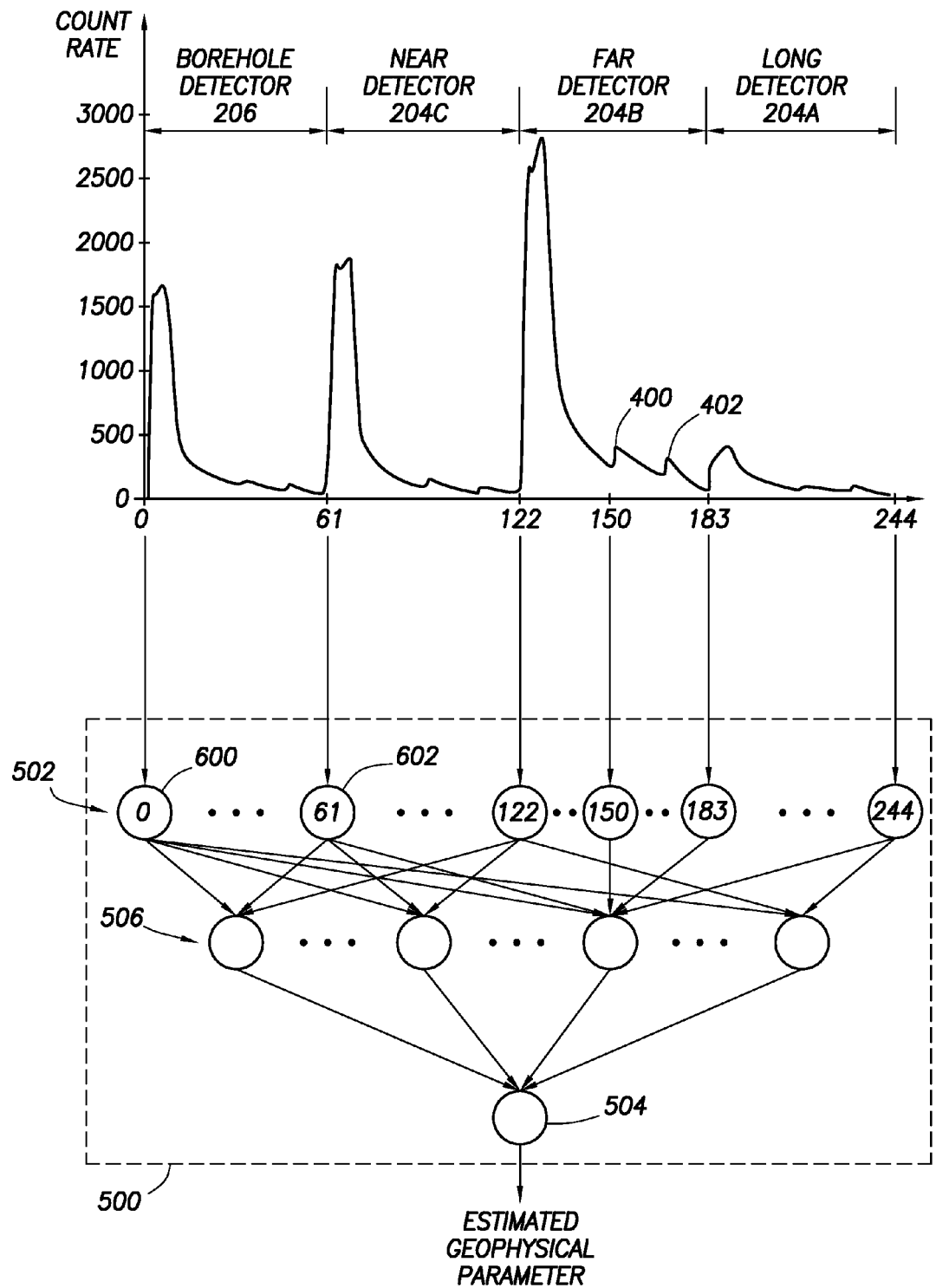
FIG. 6 graphically represents application of count values in time bins to respective input nodes of a neural network in accordance with at least some embodiments.

In accordance with the various embodiments, the data applied to the input nodes 502 are respective count values from time bins from the full-set decay curves. FIG. 6 illustrates application of the count values to the input nodes of the neural network in accordance with the various embodiments. In particular, FIG. 6 shows the full-set decay curves of FIG. 4 and an illustrative neural network 500. FIG. 4 illustrates how the count value in each time bin is applied directly to an individual input node 502. For example, the count value for bin 0 of the full-set decay curves is applied to an input node 600 of the neural network 500. Likewise, the count value from bin 61 is applied to the input node 602 of the neural network 500. While only six input nodes are shown in the illustrative neural network 500, the neural network in accordance with these embodiments will have 244 input nodes, one each for each time bin of the full-set decay curve. By virtue of the functions implemented in the hidden nodes 506, the illustrative single output node 504 produces a calculated and/or estimated geophysical parameter, such as formation bulk density.

The graphical illustration of applying the count values from the time bins directly to the input nodes of FIG. 6 shows only an illustrative set of input nodes so as not to unduly complicate the figure. Moreover, an illustrative set of hidden nodes 506 is shown, but the number of hidden nodes 506 is limited so as not to unduly complicate the figure. In some circumstances, the number of hidden nodes 506 may be greater than the number of input nodes 502. Finally, the graphical illustration of FIG. 6 shows a single output node 504, providing a calculated and/or estimated geophysical parameter; however, multiple output nodes 504 may be implemented, with each output node 504 providing a calculated and/or estimated geophysical parameter. The geophysical parameters that the neural network 500 may predict may comprise, but are not limited to, formation bulk density, porosity of the formations surrounding the borehole, and/or sigma.

Thus, in accordance with the various embodiments the count values from each time bin of the full-set decay curves are applied one each to each input node of the neural network performing the processing of the data. In the illustrative situation of FIG. 6, all 244 of the time bins are applied to respective input nodes 502. However, in alternative embodiments, prior to application of the count values to the input nodes, various time bins within the full-set decay curves may be combined to reduce the number of input nodes used on the neural network. For example, in some embodiments the count values from contiguous time bins may be combined (summed) to create a condensed time bin count value (and thus condensed full-set decay curves). For example, the 244 time bins of full-set decay curves may be condensed to 60 time bins in condensed full-set decay curves, and the count values from the 60 time bins applied one each to input nodes of a neural network for further processing and estimation of geophysical parameters.

Once the full-set decay curves for a particular borehole depth are created, the full-set decay curves (or in alternative embodiments the condensed full-set decay curves) are applied to the neural network, and the neural network produces an estimation of one or more geophysical parameters at that borehole depth. The process is repeated for each borehole depth such that a plurality of data points of the one or more geophysical parameters are created and the plurality of points may be applied to paper charts or monitor-based graphs that geologists and others skilled in interpreting such information are accustomed to seeing, typically known as "logs".

As mentioned in passing above, the neural networks do not inherently know how to calculate and/or estimate geophysical parameters, and thus training of the neural network is needed. The training may take many forms depending on the situation and the type of data available. For example, for sigma values, sigma values are usually known from other operations, and thus training the neural network with respect to sigma calculations may be based on the previously known or available data. Further with respect to sigma, if sigma data is not available, then other commercially available sigma estimations may be used, either with respect to data from a generalized set of input data, or with respect to boreholes in the vicinity of the borehole in which the logging tool 10 is to be utilized. In other words, the neural network may be trained with data obtained from a developmental well in proximity to the borehole of interest.

Further, before use, a neural network believed to be properly trained may need to be validated for proper operation. In accordance with at least some embodiments such validation occurs by use of multi-pass logs that are generally available for training wells. In these embodiments, certain passes of the multi-pass logs may be used for training purposes, and other passes of the multi-pass logs may be applied to the neural network to perform a validation of the neural network training. As an alternative, the neural network may be trained with the data from the multi-pass logs, and then the data from the multi-pass logs may be merged to create synthetic data which is then applied to the neural network for purposes of validation.

As mentioned above, the number of neutrons generated and/or released by the neutron source 210 may vary. While the various embodiments refrain from taking ratios of count values as between detectors, in some embodiments differences in gamma count values based on the number of neutrons released may be addressed in a pre-processing step (that is, before application of the count values to their respective input nodes of the neural network). The pre-processing may be referred to as normalization, and the normalization may take many forms. In some embodiments the logging tool 10 may comprise a neutron counter that counts or makes an estimate of the number of neutrons released during each burst. The neutron counter may be integral with the neutron source 210, or the tool 10 may comprise a separate neutron counter at a spaced apart location from the neutron source 210. Regardless of the precise placement of the neutron counter, in embodiments where normalization takes place, the gamma count values may be increased or decreased as a function of the number of neutrons released during the burst period of the interrogation. In yet still other embodiments, the gamma count values may be adjusted based on count values from previous interrogations within the same borehole, or based on neutron logging and corresponding count rates from boreholes in the vicinity of the borehole of interest. Further still, the count values may be adjusted based on count values received from a different logging tool within the same or a different borehole. However, normalization of the count values does not destroy the status of a plurality of count values as being a gamma count rate decay curve.

Figure 7:
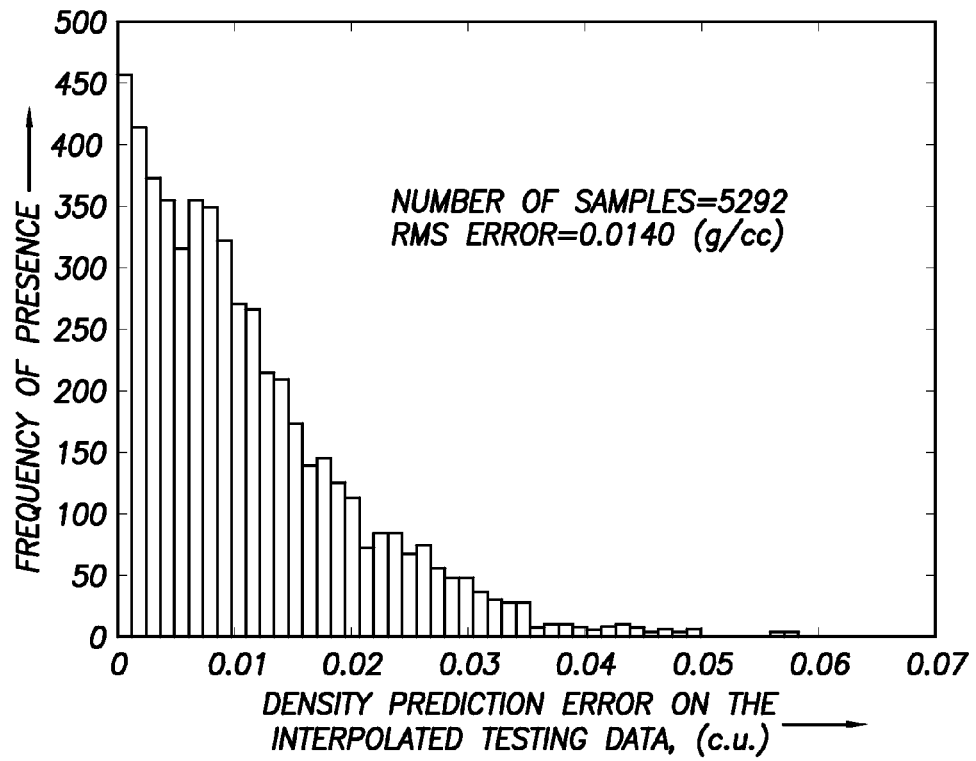
FIG. 7 shows a histogram of density error for plurality of data values.
Figure 8:
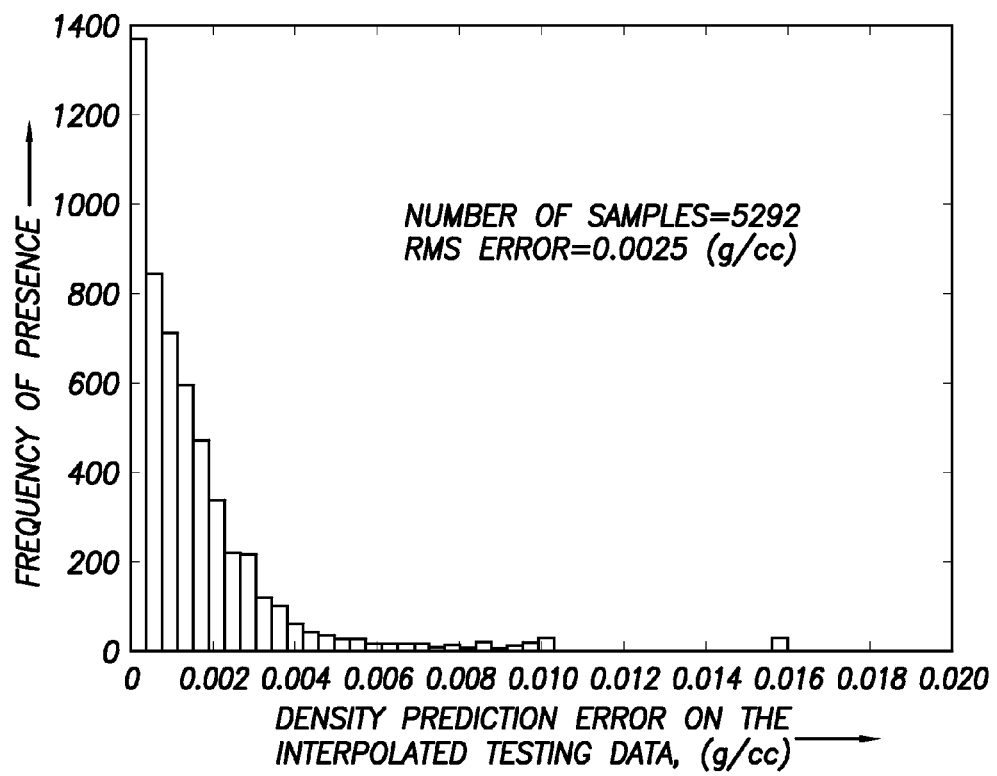
FIG. 8 shows a histogram of density error values for processing in accordance with the various embodiments.

As part of the developmental process, the inventors of the present specification tested the techniques described herein. For example, a set of simulated data were created using Monte Carlo simulation techniques, with the simulated data spanning a variety of open-hole formation, borehole, fluid and signal conditions. The data generated was applied both to the neural network processing techniques of the various embodiments, and also to the related art neural network processing technique that use windowed data (and ratios as discussed above). FIG. 7 shows a histogram of the density prediction error using the windowed count values and neural network processing in accordance with the related art. In particular, FIG. 7 illustrates that for the 5,292 samples processed, the root mean square (RMS) error using the windowed technique was 0.0140 grams per cubic centimeter (g/cc). By contrast, FIG. 8 illustrates a histogram of the density prediction error using the processing techniques of the various embodiments. In particular, FIG. 8 shows that for the same 5,292 samples, processing the samples using the techniques of the various embodiments resulted in a RMS error of 0.0025 g/cc. Thus, the density predictions of a neural network that is provided the count values directly as inputs to the input nodes may provide significant increase in precision with respect to calculated and/or predicted geophysical parameters.

Figure 9:
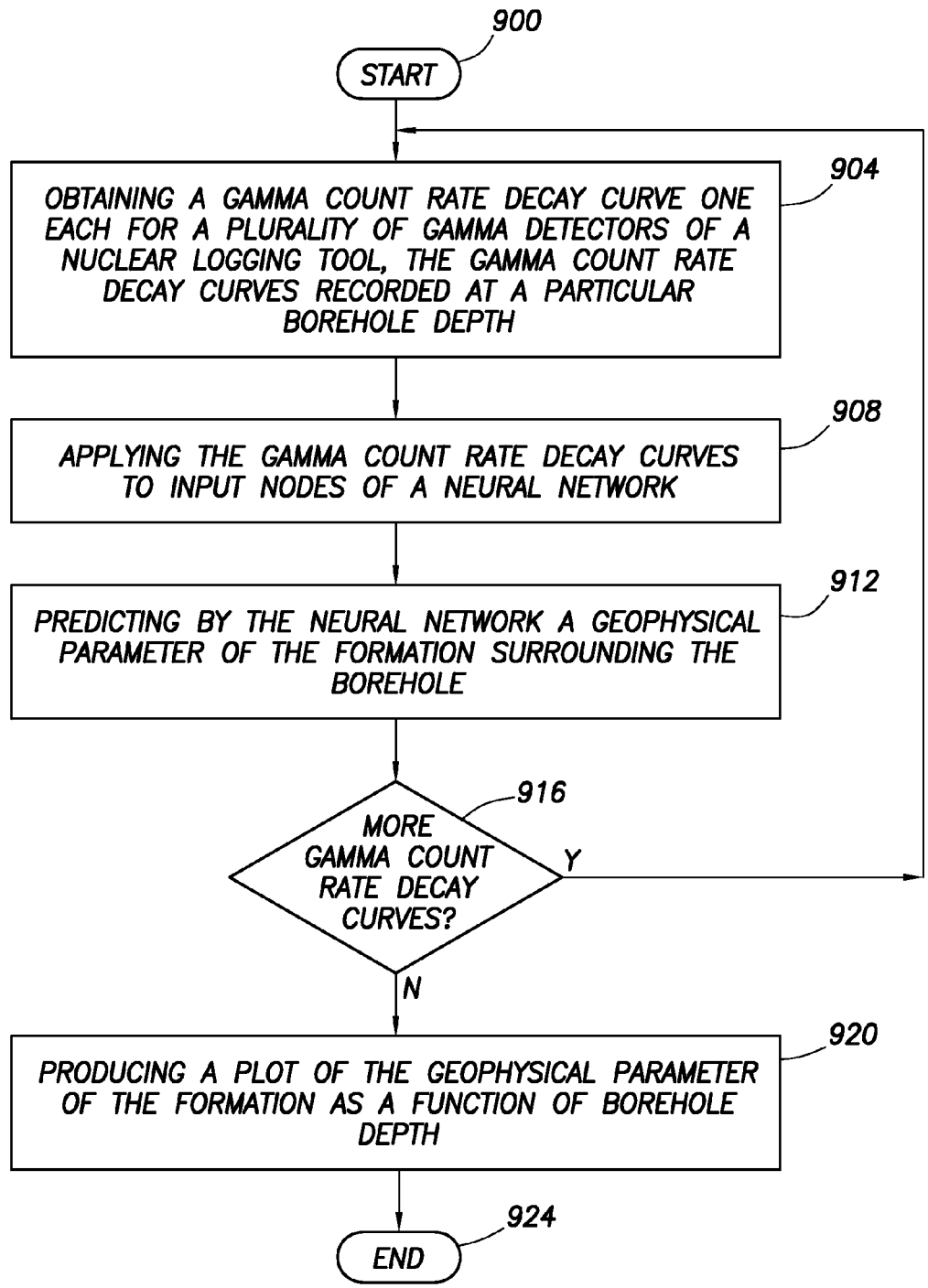
FIG. 9 shows a method in accordance with at least some embodiments.

FIG. 9 illustrates a method in accordance with at least some embodiments. In particular, the methods start (block 900) and proceeds to obtaining a gamma count rate decay curve one each for a plurality of gamma detectors of a nuclear logging tool, the gamma count rate decay curves recorded at a particular borehole depth (block 904). In some cases, the obtaining of the gamma count rate decay curves is contemporaneous with operating a nuclear logging tool in the borehole, and in other cases the obtaining of the gamma count rate decay curves may be by querying a data base of gamma count rate decay curves obtained in logging operations in the past. Regardless of whether the gamma count rate decay curves are created contemporaneously or gathered from historical data, the next illustrative step is applying the gamma count rate decay curves to input nodes of a neural network (block 908). Based on the data supplied at the input nodes, the neural network predicts a geophysical parameter of the formation surrounding the borehole (block 912). The applying of the gamma count rate decay curves and predicting geophysical parameters is repeated for a plurality of borehole depths (block 916). Next, a plot is produced of the geophysical parameter of the formation as a function of borehole depth (block 920) and the method ends (block 924).

In accordance with at least some embodiments, the processing to determine the one or more geophysical parameters may be performed contemporaneously with obtaining the gamma count rate decay curves, or may be performed at a later time, such as by a surface computer at the central office of the oilfield services company. FIG. 10 illustrates in greater detail a surface computer 22. The surface computer 22 described with respect to FIG. 10 could be proximate to the borehole during the time period within the tool 10 is within the borehole, or the surface computer 22 could be located at the central office of the oilfield services company. The central computer 22 comprises a processor 1000, and the processor couples to a main memory 1002 by way of a bridge device 1004. Moreover, the processor 1000 may couple to a long term storage device 1006 (e.g., a hard drive) by way of the bridge device 1004. Programs executable by the processor 1000 may be stored on the long term storage device 1006, and accessed when needed by the processor 1000. The program stored on the long term storage device 1006 may comprise programs to implement the various embodiments of the present specification, including programs to implement the artificial neural networks. In some cases, the programs are copied from the long term storage device 1006 to the main memory 1002, and the programs are executed from the main memory 1002. The geophysical parameters predicted by the surface computer 22 may be sent to a plotter that creates a paper-log, or the geophysical parameters may be sent to a computer screen which may make a representation of the log for viewing by a geologist or other person skilled in the art of interpreting such logs.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a computer-readable media that stores a software program to implement the method aspects of the various embodiments.

The above discussion is meant to be illustrative of the principles and various embodiments of the present invention. Numerous variations and modifications will become apparent to those skilled in the art once the above disclosure is fully appreciated. For example, though individual neural networks are illustrated in the various drawings, it will be understood that ensembles of neural networks may be equivalently used, particularly in situations where multiple geophysical parameters are being estimated for any particular borehole depth. Moreover, in some embodiments the neural network processing is performed contemporaneously with the gathering of the data by the tool 10. In the contemporaneous situations, the surface computer 22 may not only control the logging tool 10, but may also collect and perform the neural network-based processing of the data to produce the various logs. In other embodiments, the full-set decay curves may be processed at a time after collection of the data, such as by processing by central computer at the home office. Finally, other preprocessing of the data may take place, such as dead-time correction and environmental correction, without affecting scope of this specification. It is intended that the following claims be interpreted to embrace all such variations and modifications.

We claim:
1. A system comprising:
 a downhole tool comprising:
  a source of neutrons;
  a first gamma detector at a first elevation on the downhole tool, the first gamma detector positioned to favorably receive gammas from a borehole side of the downhole tool;
  a second gamma detector at the first elevation, the second gamma detector positioned to favorably receive gammas from the formation;
  a third gamma detector at a second elevation more distant from source of neutrons than the first elevation; and
  a fourth gamma detector at a third elevation more distant from the source of neutrons than the second elevation;
  each gamma detector counts gamma arrivals to create a gamma count rate decay curve for the respective gamma detector, each gamma count rate decay curve comprising a plurality of time bins with respective count values;
 a computer system comprising a processor and a memory, the computer system communicatively coupled to recorded gamma count rate decay curves;
 the memory stores a program that, when executed by the processor, causes the processor to:
  apply the count value of each time bin one each to input nodes of a neural network of the program; and
  predict, by the neural network of the program, a geophysical parameter of the formation surrounding the borehole for each of a plurality of depths within a borehole.

2. The system of claim 1 wherein, prior to application of the count values to the input nodes, the program normalizes the gamma count rate curves to account, at least in part, for fluctuations of a number of neutrons released by the source of neutrons.

3. The system of claim 1 wherein when the processor predicts, the program causes the processor to predict a plurality of geophysical parameters of the formation surrounding the borehole.

4. The system of claim 1 wherein when the processor predicts, the program causes the processor to predict at least one selected from the group consisting of: formation bulk density; porosity; and macroscopic capture cross-section.

* * * * *

UNITED STATES PATENT AND TRADEMARK OFFICE
CERTIFICATE OF CORRECTION

PATENT NO. : 8,660,796 B2
APPLICATION NO. : 12/740726
DATED : February 25, 2014
INVENTOR(S) : Jacobson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 32 days.

Signed and Sealed this
Twenty-ninth Day of September, 2015

Michelle K. Lee
*Director of the United States Patent and Trademark Office*